United States Patent [19]

Wu

[11] Patent Number: 5,738,887

[45] Date of Patent: Apr. 14, 1998

[54] PROCESS OF PREPARING FRUIT/ VEGETABLE JUICE AND PROTEIN EMULSION WITH MULTI-ENZYME SYSTEM

[76] Inventor: Wencai Wu, 11 Ganggou, Haidian Dist, Beijing, P. R., China

[21] Appl. No.: 726,011

[22] Filed: Oct. 4, 1996

Related U.S. Application Data

[63] Continuation of Ser. No. 288,393, Aug. 10, 1994, abandoned.

[30] Foreign Application Priority Data

Aug. 17, 1993 [CN] China ............................ 93 1 09779.7

[51] Int. Cl.⁶ ...................................................... A23L 2/02
[52] U.S. Cl. ........................................... 426/51; 426/599
[58] Field of Search ...................................... 426/51, 599

[56] References Cited

U.S. PATENT DOCUMENTS

| | | | |
|---|---|---|---|
| 3,754,932 | 8/1973 | Baker et al. | 426/51 |
| 4,275,648 | 6/1981 | Mauri et al. | 426/51 |
| 4,371,552 | 2/1983 | Posorske | 426/51 |
| 4,388,330 | 6/1983 | Wobben et al. | 426/51 |
| 4,478,856 | 10/1984 | Adler-Nissen et al. | 426/46 |
| 4,478,940 | 10/1984 | Adler-Nissen et al. | 426/51 |
| 4,483,875 | 11/1984 | Dörreich | 426/52 |
| 4,971,811 | 11/1990 | Strobel et al. | 426/50 |
| 4,971,812 | 11/1990 | Tsen | 426/51 |
| 5,019,411 | 5/1991 | Johnson et al. | 426/52 |
| 5,328,703 | 7/1994 | Nakagawa et al. | 426/52 |

FOREIGN PATENT DOCUMENTS

| | | |
|---|---|---|
| 821829 | 3/1975 | Belgium . |
| 54-11263 | 1/1979 | Japan . |
| 55-45353 | 3/1980 | Japan . |
| 61-170374 | 8/1986 | Japan . |
| 1218576 | 8/1989 | Japan . |
| 272850 | 3/1990 | Japan . |
| 2139471 | 11/1984 | United Kingdom . |

OTHER PUBLICATIONS

Bezzubov et al., 70(06):E0293 FSTA, Ultrasound and its Application in the Food Industry, 1968, abstract only.

Avakyan, B.P., 74(03): H0365 FSTA, Inhibition of secondary growth of microorganisms in wine treated simultaneously with UV rays and ultrasound, Biologicheskii Zhurnal Armenii, (1972) 25 (3) 36–39, abstract only.

*Primary Examiner*—Carolyn Paden
*Attorney, Agent, or Firm*—Birch, Stewart, Kolasch & Birch, LLP

[57] ABSTRACT

This invention relates to a process for preparing juice or protein emulsion from vegetable and/or its fruit by using a multi-enzyme system to hydrolyze the material. The multi-enzyme system comprises proteases, amylases, pectases, cellulases, hemicellulases and lysozyme, and may further comprise a supplementary enzyme. According to the invention, an ultrasonication may also be employed during the sterilization.

7 Claims, No Drawings

PROCESS OF PREPARING FRUIT/VEGETABLE JUICE AND PROTEIN EMULSION WITH MULTI-ENZYME SYSTEM

This application is a continuation of application Ser. No. 08/288,393 filed on Aug. 10, 1994, now abandoned.

BACKGROUND

The present invention relates to a process of using enzymes to extract fruit/vegetable juice, refresh dried fruits/vegetables and extract juice, or directly emulsify animal/vegetable protein to prepare fruit juice/protein drink extract or instant dry powder.

Fruit/vegetable juice is normally prepared by extraction. During the industrial process, biological enzymes are widely used to liquefy the fruits or clarify the fruit juice and to increase the amount of the juice extracted and improve the flavor of the juice at the same time. However, as only a small amount of pectase, amylase and cellulase are added to do the liquefying and clarifying, large amount of nourishing components for example, high molecular substances, such as protein, fat, dietary fiber and trace elements, etc., are lost. As a result, until now, the rate of juice extracted from fruits is as low as 40%–86%. Furthermore, as pasteurization is applied widely in the process, the original flavor of the fresh fruits, for example, Hami melon, grape, peach, pear is severely lost and juices so prepared do not taste the original fresh flavor and fragrance at all. The only way to make up for the loss of flavor is to add in great amounts of saccharide sweet agents, essence and even pigment. Though in recent years, new processes have been proposed in the U.S., Japan and European countries that have better results in the sterilizing and fresh-keeping fruit juice, yet the complication of the equipments needed and the high cost incurred have stopped many juice manufacturers from applying the processes.

Another problem raised in processing fruit/vegetable juice is that dried fruits/vegetables cannot be used directly as the raw material to manufacture drinks of high quality and good flavor, which greatly limits the manufacturing activity to those specific periods when fresh raw materials are available.

Health drinks of natural animal/vegetable protein have been the subject of development in recent years. However, the application of biological enzyme technology is still under exploration. At present, the mostly used process in industrial application is separating and then emulsifying protein, by which the transfer rate of the raw material is low and emulsifying agents, essence and sweet agents have to be added to stabilize the product and improve the flavor of the product. Similar to the fruit/vegetable juice processed by the traditional process, the products manufactured by the above process have drawbacks in flavor, taste and freshness as well. Moreover, as pasteurization is applied, the color of the product tends to be dark. In addition, the above process can only be applied to processing certain few kinds of raw materials.

The primary object of the present invention is to provide a novel process of using enzymes to produce fruit/vegetable juice and protein emulsion, which 1. Overcomes the problem of low transfer rate of raw material (40%–86%) and low rate of juice produced by the traditional process so as to almost completely utilize the raw materials of fresh fruits and vegetables, whereby the solid content of the juice is close to, or the same with that in the concentrated juice manufactured by the traditional process;

2. Overcomes the problem in the traditional process that dried fruits/vegetables cannot be used as raw materials by refreshing raw materials of dried fruits/vegetables to produce clarified juices which, in nourishment and flavor, are the same with, or even better than, clarified drinks produced from fresh raw materials;

3. Overcomes the problem in the traditional process that raw materials of high animal/vegetable protein cannot be directly emulsified to produce drinks by directly emulsifying raw materials of all kinds of animals/vegetables that contains over 15% of protein and making the rate of transfer almost 100%;

4. Overcomes the problem brought by using the traditional pasteurization that the nourishment and flavor of the juice are severely destroyed by using, instead, a novel sterilizing process that is industrially applicable so as to keep the unique flavor of the raw materials to the maximum,

SUMMARY OF THE INVENTION

The present invention relates to a process of preparing juice or protein emulsion from vegetables or fruits, which comprises forming a mash from raw material, finely grinding the mash so that the size of the suspension particles of the said mash is less than 50 μm, treating the ground material with biological enzymes to promote the hydrolysis of the said material, which biological enzymes comprising proteases, amylases, pectases, cellulases, hemicellulases, and lysozymes, filtering said enzymatic hydrolysis material to eliminate the remnants, and sterilizing the enzymatic hydrolysis material. The present invention also relates to juice and protein emulsion prepared by using the above process.

DETAILED DESCRIPTION OF INVENTION

According to the present invention, a process of using vegetables or their fruits as the raw material to produce juice or protein emulsion comprises treating the said raw material with biological enzyme system that contains multi-biological enzymes to promote the hydrolysis of the said raw material. Before treating the raw material with the said biological enzyme system, the raw material is pre-treated in the following steps.

First, the raw material is crushed or beaten to form a mash by conventional processes, such as mechanical crushing or beating process. The particles of the crushed or beaten raw material are small, making it easier to perform the next steps. The average size of the said particles is less than 150 meshes or less than 100 meshes for raw materials which are comparatively drier. During the formation of the mash, the crushed or beaten raw material may also be pre-soaked. In some instances, the pre-soaked step may be taken place before the raw material is crushed or beaten, particularly when the raw material is drier. Generally speaking, moisture in the raw material is gradually lost during storing, and the longer the material is stored, the more moisture will be lost. Therefore, for raw material that has lost moisture or is dry, an adequate amount of water is added during the step of pre-soaking in order to maintain the moisture content of the cracked raw material. The amount of water added for dry raw material is normally 4–10 times of the weight of the said material. The time of pre-soaking varies according to the degree of freshness of the raw material. The fresher the material is, the shorter it will be pre-soaked. Normally, the pre-soaking time is 10 minutes to 36 hours.

The pre-soaked material is then subject to fine grinding. The size of the suspended particles of the finely ground material is less than 50 μm, preferably less than 25 μm.

The ground mash is then treated with biological enzymes to promote the hydrolysis of the material. The biological enzymes used in the present invention is multi-enzyme system that comprises proteases, amylases, pectases, cellulases, hemicellulases and lysozymes. In addition, according to the type of raw materials to be treated, the multi-enzyme system may further comprise one or more of supplementary enzymes, such as lipases, glucose transferases, peptichainases, or glucase peptidases, etc.

During the enzyme treatment, the activity unit of the enzyme is 20,000–10,000,000 IU/g and the specific activity concentration is 0.1–100 IU/g substrate. With the increase in the loss of moisture in the raw material, the specific activity concentration of the enzyme system used is slightly increased. Generally, the temperature of enzyme hydrolysis is about 20°–70° C. and the time of enzyme hydrolysis is from about 5 minutes to about 72 hours.

The enzyme-treated material is then filtered to eliminate the residues. During the filtering step, the material is first filtered and then subjected to ultramicro filtration so that the particles of the filtered material are of the desired average sizes. Generally, for clarified juice products, particles over 0.2 µm are removed while for protein emulsion particles over 1.0 µm are eliminated.

In order to enable the product to have good stability for storage, the filtered solution is then sterilized. The sterilization of the present invention is carried out under a temperature between about 0° C. and about 55° C. The method of sterilizing used in the present invention involves methods, such as, ultrafiltration, or lysozyme or penicillinase sterilization and ultrafiltration, which are developed in recent years [See BE821829(1973); and US4971812(1990)].

The sterilizing step in the present invention may also use an ultrasonic sterilizing method invented by the present applicant, which comprises killing the bacterium and enzymes and sterilizing the material while it is flowing through an ultrasonication apparatus. The frequency of the ultrasonic waves suitable for use in the present invention is about 20–100 KHz, the power density is over 100 W/cm$^2$, and the flow speed is about 1–25 m/s.

With ultrasonic sterilizing method of the present invention, it is possible to perform steps of sterilizing and bacteria-killing at temperatures lower than 55° C. As the material can be sterilized at temperatures lower than 55° C., the nourishment and flavor of the juice and/or protein emulsion may be maintained and the stability for storage of the product is improved.

According to the present invention, the types of vegetables and/or their fruits that may be processed to prepare juice or protein emulsion by the process of the present invention are many, almost including all the vegetables and/or their fruits. For example, raw materials that may be processed are melons and gourds fruits, starchy fruits, multi-cellulose fruits, oranges with thick oily skins, vegetables, beans, nuts, algae, fungus, cereals, cereal plumults, etc., or the mixture of two or more of them.

According to the present invention, the multi-enzyme system used in the process comprises, by weight, 5 to 50% of proteases, 5 to 75% of amylases, 5 to 50% of pectases, 5 to 75% of cellulases, 5 to 35% of hemicellulases and 1 to 20% of lysozymes. Depending on the raw materials to be processed, the multi-enzyme system may further comprise one or more supplementary enzymes, for example, 0 to 40% of lipases, 0 to 20% of glucose transferases; 0 to 40% glucase peptidases; and 0 to 20% of peptichainase.

The above compound system of multi-enzymes may be preferably divided into the following categories according to the different types of raw material to be processed. Unless otherwise indicated, all the percentages used in the specification is weight percentages.

1. For processing raw material of fresh melons and gourds, such as watermelon, whitemelon, brandmelon, snakemelon, Chinese wax gourd, Buddhism'shandmelon, rlamiflame melon, pumpkin, cucumber, bittergourd, papaya, balsam pear, Chinese flowering quince, vegetable sponge and muskmelon, etc., or the mixture of two or more of them; the enzyme system preferably comprises 5–50% of proteases, 5–15% of amylases, 25–40% of pectases, 5–16% of cellulases, 10–25% of hemicellulases, 10–15% of lysozymes, 5–10% of lipases, and a supplementary enzyme, such as 5–10% of glucase peptidases. The above multi-enzyme system makes it possible to process the melons/gourds together with their skins, seeds and stones to make fresh melon/gourd juice or instant powder.

2. For processing raw materials of dried melons/gourds, such as air-dried, dehydrated or preserved products of the above-mentioned melons/gourds, or the mixture of two or more of them, the enzyme system preferably comprises 5–50% of proteases, 5–20% of amylases, 5–15% of pectases, 30–50% of cellulases, 5–10% of hemicellulases, 5–15% of lysozymes, 5–10% of lipases, and one or more of supplementary enzymes of 5–10%.

3. For processing raw materials of fresh fruits, such as pineapple, polarimaya, strawberry, guava, flowering crabapple, yollowpine, pear, plum, lichen, berry, loquat, apple, grape, green plum, ginsenberry, mulberry, narrow-leaved oleaster, Chinese date, persimmon, peach, fig, apricot, red bayberry, cherry, kiwi, etc., or the mixture of two or more of them, the enzyme system preferably comprises 5–30% of proteases, 5–10% of amylases, 30–40% of pectases, 5–15% of cellulases, 15–20% of hemicellulases, 5–10% of lysozymes, 5–10% of lipases, and one or more of supplementary enzymes of 10–20%. The said multi-enzyme system makes it possible to process the above-mentioned fruits together with their skins, seeds and stones to make fruit juice or instant powder.

4. For processing raw materials of dried fruits listed in the item 3, such as dried apricot, dried apple, dried flowering crabapple, dried grape, etc., or the mixture of two or more of them, the biological enzyme system preferably comprises 10–30% of proteases, 5–10% of amylases, 5–20% of pectases, of 15–45% of cellulases, 5–25% of hemicellulases, 1–5% of lysozymes, and one or more of supplementary enzymes of 5–20%.

5. For processing raw materials of fresh fruits rich in starch, such as banana and bajino banana, or the mixture of two more of them, the enzyme system preferably comprises 10–20% of proteases, 30–50% of amylases, 10–15% of pectases, 10–20% of cellulases, 10–25% of hemicellulases, 5–10% of lysozymes, and one or more of supplementary enzymes of 0–10%.

6. For processing raw materials of dried fruits rich in starch, such as dried bananas, or the mixture of two or more of them, the enzyme system preferably comprises 10–20% of proteases, 30–50% of cellulases, 5–10% of pectases, 20–35% of cellulases, 5–15% of hemicellulases, 1–5% of lysozymes, and one or more of supplementary enzymes of 0–10%.

7. For processing raw materials of poly-cellulose fresh fruits, such as sugarcane, hawthorn, and various kinds of wild fruits, or the mixture of two or more of them, the enzyme system preferably comprises 10–30% of proteases, 20–40% of amylases, 5–10% of pectases, 20–50% of cellulases, of 5–15% of hemicellulases, 5–10% of lysozymes, 5–10% of glucose transferases and one or more of supplementary enzymes of 0–5%. The above enzyme system makes it possible to process the fruits together with their skins, seeds and stones to make fruit juice or instant powder.

8. For processing raw materials of dried fruits with poly-cellulose, such as dried hawthorn, wild roses, rhodiola sacra and cactus, or the mixture of two more of them, the enzyme system preferably comprises 10–30% of proteases, 20–30% of amylases, 1–10% of pectases, 25–40% of cellulases, 1–5% of hemicellulases, 1–5% of lysozymes, and one or more of supplementary enzymes of 0–10%.

9. For processing fruits with thick oily skin, such as orange, Mandarin orange, tangerine, etc., or the mixture of two or more of them, the enzyme system preferably comprises 5–15% or proteases, 5–10% of amylases, 30–40% of pectases, 10–20% of cellulases, 20–35% of hemicellulases, 5–10% of lysozymes, 5–10% of glucase peptidases, and one or more of supplementary enzymes of 0–5%. For further processing of the skins after the oil has been removed (including dried fruits), the enzyme system preferably comprises 5–10% of amylases, 20–35% of pectases, of 20–45% of cellulases, 10–20% of hemicellulases, 1–5% of lysozymes, 10–40% of glucase peptidase, and one or more of supplementary enzymes of 0–5%.

10. For processing raw material of fresh vegetables, such as mung bean sprouts, soybean sprouts, water chestnut, lily, potatoes, carrot, ginger, radishes, lotus root, Chinese yam, bamboo shoots, Chinese cabbage, spinach, cauliflower, water shield, Chinese onion, garlic, amaranth, fennel, shepherd's purse, wild rice stem, lent mustard, Chinese chive, sonchus oleraceus, fern, aspirates, Lucerne, celery, shepherd's purse, leek, lettuce, water spinach, tender leaves of Chinese toon and coriander, etc., or the mixture of two or more of them, the enzyme system preferably comprises 10–30% of proteases, 5–20% of amylases, 5–30% of pectases, 15–40% of cellulases, of 20–30% of hemicellulases, 5–10% of lysozymes, and one or more of supplementary enzymes of 1–5%. The enzyme system is the same for processing tender roots, stems, leaves and flowers of wild or cultivated plants, such as lotus leat, ginseng, American ginseng, ginkgo leave and bamboo leaf or the mixture of two or more of them.

11. For processing raw materials of dried vegetables, such s dried lily, dried potatoes, dried fern and dried day-lily buds, etc., the mixture of two or more of them, the enzyme system preferably comprises 10–30% of proteases, 10–25% of amylases, 5–15% of pectases, 20–50% of cellulases, 10–20% of hemicellulases, 1–5% of lysozymes, and one or more of supplementary enzymes of 0–5%.

12. For processing raw materials of beans, dried or fresh, as long as the protein content therein is over 15%, such as hyacinth bean, broadbean, black soybean, love pea, string bean, mung bean, pea, and red bean, etc., or the mixture of two of more of them, the enzyme system preferably comprises 20–50% of proteases, 10–35% of amylase, 5–10% of pectases, 5–25% of cellulases, 10–20% of hemicellulases, 5–20% of lysozymes, 5–10% of lipases, and one or more of supplementary enzymes of 0–10%. The enzyme system is the same for processing raw material of nuts having protein of over 15%, such as peanut, walnut, apricot stone, Chinese olive, ginkgo, sunflower seed, watermelon seed, lotus seed, pumpkin seed, coconut, and hazelnut, etc., or the mixture of two or more of them.

13. For processing raw materials of the stones of nuts having a protein content of less than 15%, such as chestnut, gorgon seed, and the seed of Job's tears, etc., or the mixture of two or more of them, the enzyme system preferably comprises 5–20% of proteases, 30–55% of amylases, 5–10% of pectases, 5–10% of cellulases, 5–15% of hemicellulases, 5–10% of lysozymes, 1–5% of lipases and one or more of supplementary enzymes of 5–10%.

14. For processing raw materials of algar, such as kelp, agar, laver, skirt algar, and sprio algar, etc., the mixture of two or more of them, the enzyme system preferably comprises 25–50% of proteases, 5–10% of amylases, 30–50% of pectases, 5–10% of cellulases, 5–10% of hemicellulase, 1–5% of lysozymes, 0–5% of lipase, and one or more of supplementary enzymes of 0–5%. The above enzyme system may be used to process both dried and fresh raw materials of above type.

15. For processing raw materials of fresh fungus, such as mushroom, red mushroon, hedgehog Hyundai, yollow mushroom, daylily mushroom, mouth mushroom, black edible fungus, tremella, Xianggu mushroom, zhen mushroom, pine mushroom, and morel, etc., or the mixture of two or more of them, the enzyme system preferably comprises 5–50% of proteases, 5–10% if amylases, 20–30% of pectases, 5–40% of cellulases, 5–10% of hemicellulases, 5–25% of lysozymes, and one or more of supplementary enzymes of 0–5%.

16. For processing raw materials of dried fugues, the enzyme system preferably comprises 5–50% of proteases, 5–10% of amylases, 5–20% of pectases, 10–50% of cellulases, 5–10% of hemicellulases, 1–5% of lysozymes, and one or more of supplementary enzymes of 0–5%.

17. For processing raw materials of grains, such as black rice, barley, wheat, corn, and shepherd seed, etc., or the mixture of two more of them, the enzyme system preferably comprises 5–15% of proteases, 50–75% of amylases, 5–10% of pectases, 5–10% of cellulases, 5–15% of hemicellulases, 1–5% of lysozymes, 20–40% of glucose transferases, and one or more of supplementary enzymes of 0–5%.

18. For processing raw materials of the plumule of grains, such as barley plumule, wheat plamule, grain plumule, and corn plumale, etc., or the mixture of two or more of them, the enzyme system preferably comprises 10–30% of proteases, 5–10% of amylases, 10–25% of pectases, 10–25% of cellulases, 5–20% of hemicellulases, 10–20% of lysozymes, and one or more of supplementary enzymes of 5–10%.

Fruit/vegetable juice and protein emulsion processed with the biological enzyme systems have the following advantages.

1. As multi-biological enzymes are used to ordinate with each other, the high molecule components in the raw materials can be decomposed fully so that juice productivity is greatly raised to 95%–99.9% from 40%–86% by the traditional process and the solid content of the juice is highly increased as well, almost the same as that of the traditional concentrated juice.

2. As the fruit are processed together with their skins and stones, the nourishment in the fruit juice/protein emulsion is maintained to the maximum, particularly, the contents of protein, amino acid and trace elements are all greater than those in the products by the traditional processes of the invention.

3. As restriction enzyme is used and macromolecules such as protein, starch, pectin, cellulose and hemi-cellulose are decomposed, the resulting product is rich in oligose-peptide, oligose and low molecule saponin which not only can be easily absorbed and digested by the human body but also have very good functions in regulating the immunity and internal secretion system, the aim of increasing the nourishment of the product can be achieved by using the process.

4. As the process of the present invention does not choose the raw materials to be processed, various kinds of plants, dried or fresh, such as nuts, dried or fresh fruits, grains with stems and leaves, and algae, can be processed.

5. When the process of the present invention is used to produce protein emulsion drinks or instant powder, the raw materials can be emulsified directly without separating the protein beforehand.

6. After concentrated and spray-dried in vacuum, the fruit juice or protein emulsion prepared by the present process can be processed into instant powder that has a rich flavor of the raw materials.

7. As the raw material is sterilized by a method of ultra-sonication of a high frequency and a large power and the post-treatment is performed at a temperature lower than 55° C., the fresh flavor of the raw material is maintained in the product and the stability for storage of the product is greatly improved.

8. The production line is simplified.

The present invention is further illustrated, but not limited, by the following examples.

EXAMPLE 1

Clear juice of watermelon was prepared by processing watermelons with the present process. Take protease of 10% of protease, 10% of amylase, 28% of pectase, 6% of cellulase, 26% of hemicellulase, 10% of lysozyme, 6% of lipase, 4% of glucos transferase. After 100 Kg of whole watermelons were beaten and finely ground, the average size of particles in the mash was less than 17 µm. The mash was then treated with the enzyme system at the reaction temperature less than 50° C. and the reaction period was 3 hours. The specific activity concentration of the enzymes is 2 IU/g substrate. After being filtered, the mash was warm-clarified for 6 hours and then was ultra-filtered, and sterilized by flowing through a ultrasonication equipment (manufactured by Cole-Parmer) of 50 KHz and 1500 W (at a power density of 140 W/cm$^2$ and a flow speed of 5.7 m/s) The juice yield was 99.6%, the contents of amino acid, trace elements, vitamins and solid content were all substantially the same with those in the watermelon raw materials, the color was clear and bright, and the juice was superior in every index to the product made by the traditional processes. (see Table 1)

EXAMPLE 2

Clarified Hami melon juice was prepared by processing dried Hami melon with the present invention. Take 15% of protease, 5% of amylase, 35% of cellulase, 10% of hemicellulase, 10% of lysozyme, 5% of lipase, 5% of glucase peptidase. After being roasted, 50 Kg of dried Hami melons were crushed into particles of 100 mesh, and infiltrated with warm water (50° C.) for 24 hours. The particles were further ground by a gum machine into a size less than 20 µm. After enough amount of water was added (based the amount of the solid content in fresh melons) and uniformly stirred the, biological enzymes were put in and mixed with the mash slowly at a temperature lower than 50° C. The specific activity concentration was 4 IU/g substrate. The mixture was then hydrolyzed for 6 hours and filtered. The filtrate was ultra-filtered and sterilized with ultrasonication (25 KHz, 1500 W, power density 100 W/cm$^2$, flowing speed 4 m/s). The transfer rate of the raw material was 96.7%, and the residues were either carbide or dirt. The juice so prepared was orange and clear in color, rich in flavor, and had a better taste than fresh melon juice prepared by conventional methods.

EXAMPLE 3

Strawberry juice was prepared by processing strawberries with the present invention. Take 15% of protease, 10% of amylase, 35% of pectase, 5% of cellulase; 15% of hemicellulase, 5% of lysozyme, 5% of lipase, 5% of glucase peptidase, 5% of peptichinease.

After washed, 200 kg of strawberries were directly beaten into particles of less than 150 mesh, finely ground into less than 50 µm, and pre-soaked for 15 minutes. The biological enzymes were added in and mixed slowly at a temperature lower than 50° C. The specific activity concentration was 1.2 IU/g substrate. The material was then hydrolyzed for 6 hours, filtered, ultra-filtered, sterilized with ultrasonication at 25 KHz, 8000 W, a power density of 180 W/cm$^2$, and a flow speed of 10 m/s. The juice productivity was 99.3%. The juice so prepared was red and clear in color, light in flavor, and refreshing and slightly sour in taste. An analysis of the nourishment shows, as in Table 2, that as the juice was prepared by processing together with the stones, its nourishment value is higher than the edible part of raw material.

EXAMPLE 4

Clear juice was prepared by processing apples with the present invention. Take 5% of protease, 10% of amylase, 30% of pectase, 10% of cellulase; 25% of hemicellulase, 5% of lysozyme, 5% of lipase, 10% of glucos transferase. After selected and washed, 20 kg of apples were directly beaten into less than 150 mesh, pre-soaked for 15 minutes in oxygen isolation, finely ground into less than 5 µm, added with the biological enzymes and mixed slowly at a temperature lower than 55° C. The specific activity concentration was 0.5 IU/g substrate. The mixture was then hydrolyzed for 6 hours, filtered, and ultra-filtered. The ultra-filtered liquid was sterilized by flowing through an ultrasonication equipment of 45 KHz, 1500 W, a power density of 120 W/cm$^2$ and a flow speed of 10 m/s. The juice productivity was 99.3%. The type of the raw material can be distinguished by watching, smelling and tasting respectively the color, flavor and content of the juice so prepared. An analysis of the nourishment shows, as in Table 3, that as the juice was prepared by processing together with the skins and stones, its nourishment value is higher than the edible part of the raw material, and much higher than that of the products made by the traditional process.

EXAMPLE 5

Clear grape juice was prepared by processing dried grapes with the present invention. Take 10% of protease, 5% of amylase, 20% of pectase, 35% of cellulase, 15% of hemicellulase, 5% of lysozyme, 10% of glucos transferase. After washed, 50 kg of dried grapes were pre-soaked in water of 50° C. for 24 hours to be infiltrated, mechanically beaten into less than 150 mesh, pre-soaked for 15 minutes, finely ground into less than 5 µm, added with the biological enzymes and mixed together slowly at 50° C. The specific activity concentration was 0.6 IU/g substrate. The mixture was then hydrolyzed, filtered, and ultra-filtered. The ultra-filtered liquid was sterilized by flowing through an ultrasonication equipment of 50 KHz, 8000 W, a power density of 180 W/cm$^2$ and a flow speed of 10 m/s. The transfer rate was 98.9%. The juice so prepared was amber colored, clear and transparent, the amount of the solid content is the same with that of fresh grapes, rich in flavor, and sweet and slightly sour in taste.

EXAMPLE 6

Banana juice and instant banana powder were prepared by processing bananas with the present invention. Take 10% of protease, 45% of amylase, 10% of pectase, 10% of cellulase, 15% of hemicellulase, 5% of lysozyme, 5% of glucase peptidase. After peeled, 200 kg of bananas were directly beaten into a thick mash of less than 150 mesh, added with an adequate amount of water of 60° C. based on an estimated amount of the solid content of 10–15%, mixed up evenly, pre-soaked for 20 minutes, finely ground into less than 15 μm. The biological enzymes were then added in and mixed together slowly at 50° C. The specific activity concentration was 7 IU/g substrate. The mixture was hydrolyzed for 10 hours, filtered to remove sediment, and ultra-filtered. The ultra-filtered liquid was sterilized by flowing through an ultrasonication equipment of 25 KHz/2000 W, a power density of 150 W/cm$^2$ and a flow speed of 7 m/s. The juice prepared was transparent, light yellow in color and slightly sweet and fragrant in taste. When concentrated and spray-dried in vacuum, the juice can be processed into water-soluble instant powder that has the exact taste and flavor with fresh bananas when added with water. The transfer rate (of the edible part) was 98.4%.

EXAMPLE 7

Clear juice or instant powder of fresh hawthorn was prepared by processing hawthorn with the present invention. Take 10% of protease, 30% amylase, 10% of pectase, 30% of cellulase, 8% of hemicellulase, 2% of lysozyme, 10% of lipase.

After selected and washed, 30 kg of fresh hawthorns with pits in were beaten directly into less than 150 mesh, added with water to have the estimated amount of the solid content 10–15%, pre-soaked for 15 minutes, finely ground into less than 5 μm, added with the biological enzymes and mixed together slowly at 50° C. The specific activity concentration was 50 IU/g substrate. The mixture was hydrolyzed for 14 hours, then filtered to remove sediments and ultra-filtered. The ultra-filtered liquid was sterilized by ultrasonication. The transfer rate of the raw materials was 97% (while the remnant rate is 3%). The juice so prepared was clear and transparent, dark red in color and sour in taste. When concentrated and spray-dried in vacuum, the juice can be processed into instant powder that tastes the same as juice of fresh hawthorns when added with water.

EXAMPLE 8

Hawthorn juice or instant powder was prepared by processing dried hawthorns with the present invention. Take 10% of protease, 25% of amylase, 10% of pectase, 40% of cellulase, 1% of lysozyme, 4% of hemicellulase, 5% of lipase.

After roasted, 10 kg of dried hawthorns was crushed into 100 mesh, pre-soaked in water of 50° C. for 24 hours and the mash was adjusted with water to have an amount of the solid content of 10–25%. The mash was then finely ground into less than 2 μm. The other steps of the process was the same with that in Example 7 except the specific activity concentration was 100 IU/g substrate. The juice so prepared is exactly the same in quality with juice of fresh hawthorns. The transfer rate of raw material was 96.7%. An analysis of the nourishment shows, as in Table 4, that the nourishment composition of juice prepared from dried hawthorns is the same with that of fresh hawthorns.

EXAMPLE 9

Fresh orange juice was prepared by processing fresh oranges with the present invention. Take 8% of protease, 7% of amylase, 35% of pectase, 10% of cellulase, 25% of hemicellulase, 5% of lysozyme, 10% of glucase peptidase. After peeled, 200 kg of fresh orange, together with the tangerine pithes and pits in, were beaten into 150 mesh, pre-soaked at 50° C. for 15 minutes, finely ground into less than 15 μm, and added with the biological enzymes. The specific activity concentration was 1 IU/g substrate. Stirred at low speed at 50° C. and hydrolyzed for 3 hours, filtered to remove residues and ultra-filtered. The ultra-filtered liquid was sterilized by ultrasonication under the same conditions as in Example 7. The juice productivity was 98.4%. The orange juice so prepared was transparent and orange in color, fragrant in flavor, and sweet and sour in taste.

EXAMPLE 10

Instant orange powder was prepared by processing oil-removed orange skins with the present invention. Take 20% of cellulase, 6% of amylase, 24% of pectase, 20% of cellulase, 10% of hemicellulase, 2% of lysozymes, 18% of glucase peptidase. After oil was removed and essence extracted, 40 kg of orange skins were roasted, crushed into 100 mesh, soaked at 50° C. for 24 hours to be fully infiltrated, finely ground into less than 5 μm, pre-soaked for 15 minutes at 50° C., and added with the biological enzymes. The specific activity concentration was 20 IU/g substrate. Stirred at low speed at 50° C. and hydrolyzed for 6 hours, filtered to remove residues, and ultra-filtered. The ultra-filtered liquid was then sterilized by ultrasonication under the same conditions as in Example 7. When concentrated and spray-dried in vacuum, the liquid was processed into dried powder of orange color.

EXAMPLE 11

Carrot juice was prepared by processing carrots with the present invention. Take 10% of protease, 12% of amylase, 6% of pectase, 18% of cellulase, 30% of hemicellulase, 9% of lysozyme, 5% of lipase. After washed, 100 kg of carrots were directly beaten to less than 150 mesh, pre-soaked for 15 minutes, finely ground into less than 14 μm, and added with the biological enzymes. The specific activity concentration was 8 IU/g substrate. Added with 0.05% of emulsifier, stirred at low speed at 50° C., and hydrolyzed for 4 hours. The rest of the process was the same with Example 5. The juice productivity was 98.9%. An analysis of the nourishment shows, as in Table 5, that the nourishment composition is the same with that in the raw material except that part of the carotene is turned into VA.

EXAMPLE 12

Juice of fresh lotus roots was prepared by processing fresh lotus roots with the present invention. Take 11% of protease, 20% of amylase, 15% of pectase, 19% of cellulase, 26% of hemicellulase, 5% of lysozyme, 3% of glucase peptidase, 2% of lipase. After selected and washed, 50 kg of fresh lotus roots were directly beaten into less than 150 mesh, finely ground immediately without oxygen into less than 2 μm, pre-soaked for 15 minutes, and added with the enzymes. The specific activity concentration was 60 IU/g substrate. Stirred at low speed at 50° C., and hydrolyzed for 1 hour, filtered to remove the residues, and ultra-filtered. The rest of the process was the same with Example 5. The juice so prepared was amber colored, clear and transparent, slightly sweet, and tasty.

EXAMPLE 13

Emulsion of shelled peanuts was prepared by processing shelled peanuts with the present invention. The enzyme composition was 30% of protease, 15% of pectase, 27% of lipase, 10% of amylase, 5% of cellulase, 5% of hemicellulase, 2% of glucose transferase, 6% of lysozyme. 10% of the raw mash, 200 kg, was with the size of particles less than 2.0 µm. The specific activity concentration was 16 IU/g substrate. The reaction temperature was 25°–40° C., and the reaction time was 15 minutes. The material was filtered to remove residues, and ultra-filtered ($\leq 1$ µm), and sterilized according to Example 5. The emulsion so prepared was of good stability, with no sediments. When tested under varying temperatures (0°–50° C.) for 200 days, equaling to having been stored for 2 years that undergo the four seasons of summer, autumn, winter and spring, no stratum appeared and the emulsion remained undeteriorated. The use ratio of raw material was 99.6%. An analysis of the nourishment shows, as in Table 6, that the content of oligopeptide is $\geq 1\%$.

EXAMPLE 14

Emulsion of sun-flower seeds was prepared by processing sun-flower seeds with the present invention. Take 25% of protease, 26% of amylase, 19% of cellulase, 10% of hemicellulase, 5% of pectase, 10% of lysozyme, 5% of lipase. The specific activity concentration was 0.4 IU/g substrate.

30 kg raw material was processed according to Example 5. The emulsion so prepared was cream colored with light green, and of the same stability as the peanut emulsion in Example 13, with 2.6% of oligopeptide.

EXAMPLE 15

Instant chestnut powder was prepared by processing shelled chestnuts with the present invention. Take 5% of protease, 50% of amylase, 10% of pectase, 5% of cellulase, 10% of hemicellulase, 5% of lysozyme, 5% of lipase, 10% of glucose transferase. 100 kg of shelled chestnuts (fresh or dried) were crushed and beaten into less than 150 mesh (the ratio between dried raw material and water was 1:7, and the ratio between fresh raw material and water 1:4), soaked for 1 hour, then finely ground into less than 2 µm, pre-soaked for 15 minutes, and added with the enzymes. The specific activity concentration was 15 IU/g substrate. Stirred at low speed at 55° C., and hydrolyzed for 40 hours, filtered to remove residues, and ultra-filtered ($\leq 1$ µm). The ultra-filtered liquid was sterilized according to Example 5. When concentrated in vacuum and spray-dried, the instant powder so prepared was of the fresh flavor of fresh chestnut when added with water. The transfer rate of raw material was 99.7%.

EXAMPLE 16

Kelp juice or instant powder was prepared by processing kelps with the present invention. Take 32% of protease, 5% of amylase, 43% of pectase, 6% of cellulase, 10% of hemicellulase, 4% of lysozyme. After washed, 100 kg of fresh or water soaked kelps were mechanically beaten into less than 150 mesh, finely ground into 5 µm, and added with the enzymes. The specific activity concentration was 1.5 IU/g substrate. Stirred at low speed at 35° C., and hydrolyzed for 3 hours, filtered to remove residues, and ultra-filtered. The rest of the process was the same with Example 6. The product so prepared was of a unique flavor as a flavoring. The transfer rate or raw material was 99.8%.

EXAMPLE 17

Oral nutritional liquid of monkeyhead's mushroom was prepared by processing monkeyhead's mushroom with the present invention. Take 16% of protease, 5% of amylase, 24% of pectase, 20% of cellulase, 10% of hemicellulas, 21% of lysozyme, 4% of peptichainase. The specific activity concentration was 1.0 IU/g substrate. 20 kg of fresh or dried monkeyhead's mushroom are processed according to Example 4 to produce juice. The transfer rate of raw material was 99.3%.

EXAMPLE 18

Juice or instant powder of xianggu mushroom was prepared by processing dried xianggu mushroom with the present invention. Take 17% of protease, 5% of amylase, 19% of pectase, 40% of cellulase, 9% of hemicellulase, 5% of lysozyme, 3% of glucase peptidase, 2% of lipase. The specific activity concentration was 5 IU/g substrate. Juice or instant powder was prepared according to Example 8. The resulting product was of rich flavor and can be used as nutritional drinks or flavorings.

EXAMPLE 19

Nutritional green powder (water soluble green cellulose powder) was prepared by processing green plumales of wheat with the present invention. Take 15% of protease, 5% of amylase, 20% of pectase, 25% of cellulase, 15% of hemicellulase, 5% of peptichainase. After vernalization, 10 kg of wheat were cultivated without earth till the green sprouts were about 3 cm long and with 2–4 leaves. After washed, the sprouts were beaten into 150 mesh, finely ground into less than 4 µm, and made into instant powder according to Example 10. The resulting product was mainly of oligopeptide (about 12–15%), oligose (30–40%), low molecular glicoside (0.2–0.5%) and water soluble cellulose (50–60%).

EXAMPLE 20

Cool tea and instant tea of flowering crabapple were prepared by processing mixed tea and dried slowering crabapples with the present invention. Take 24% of protease, 8% of amylase, 18% of pectase, 25% of cellulase, 15% of hemicellulase, 5% of lysozyme, 5% of lipase. Dried flowering crabapples and tea were respectively beaten mechanically into 100 mesh, pre-soaked at 75° C. for 2 hours (tea) and 24 hours (dried flowering crabapples), mixed together at a dried weight (without water) ratio of 1:0.1–1 (flowering crabapples:tea), and finely ground into less than 10 µm. The rest of the process was the same with Example 8. The transfer rate of raw material was 95.6%.

TABLE 1

Analysis of Nourishment Composition of Water Melon Juice
Comparison of Different Processings

| | Clear Juice | | | |
|---|---|---|---|---|
| Nourishment Composition | Raw Material (Edible part) | Multienzyme + Ultrasonics | Multienzyme + Pasteuring | Pressing + Pasteuring |
| Water (g/100 g) | 92.9 | 91.0 | 91.8 | 93.5 |
| Protein (g/100 g) | 0.5 | 1.16 | 0.4 | 0.1 |
| Fat (g/100 g) | / | 0.05 | 0.05 | / |
| Dietofiber (g/100 g) | 0.2 | / | / | / |
| Carbohydrate (g/100 g) | 6.2 | 7.0 | 7.0 | 6.2 |
| Oligose (g/100 g) | 4.7 | 5.4 | 5.2 | 4.1 |
| Ash specification (g/100 g) | 0.2 | 0.84 | 0.79 | 0.2 |
| Carrotin (μg/100 g) | 0.07 | / | / | / |
| VA (mg/100 g) | 0.01 | / | / | / |
| VB1 (mg/100 g) | 0.02 | 0.05 | / | / |
| VB2 (mg/100 g) | 0.05 | 0.05 | / | / |
| Nicotinic acid (mg/100 g) | 0.4 | 0.8 | 0.6 | 0.3 |
| VC (mg/100 g) | 0.4 | 1.24 | 0.21 | 0.3 |
| VE (mg/100 g) | 0.03 | 1.18 | / | 0.01 |
| K (mg/100 g) | 78 | 255 | 249 | 77 |
| Na (mg/100 g) | 9 | 131 | 131 | 10 |
| Ca (mg/100 g) | 11 | 24 | 0.2 | 0.11 |
| Mg (mg/100 g) | 14 | 211 | 0.09 | 0.12 |
| Fe (mg/100 g) | 0.6 | 0.46 | 0.42 | 0.6 |
| Mn (mg/100 g) | 0.04 | 0.48 | 0.44 | 0.03 |
| Cu (mg/100 g) | 0.03 | 0.02 | 0.02 | 0.02 |
| Zn (mg/100 g) | 0.1 | 0.11 | 0.13 | 0.10 |
| P (mg/100 g) | 6 | 27.2 | 0.24 | 0.21 |
| Se (μg/100 g) | 0.08 | 0.10 | 0.09 | 0.07 |
| Isoleucine (Ile) (mg/100 g) | 17 | 24 | 16 | 4 |
| Leucine (Leu) (mg/100 g) | 18 | 32 | 16 | 6 |
| Lysine (Lys) (mg/100 g) | 15 | 17 | 11 | 2 |
| Methionine (Met) (mg/100 g) | / | 11 | 2 | / |
| Cystine (mg/100 g) | 4 | 4 | / | / |
| Phenylalanine (Phe) (mg/100 g) | 11 | 24 | 11 | 4 |
| Tyrosine (Tyr) (mg/100 g) | 9 | 16 | 3 | 1 |
| Threonine (Thr) (mg/100 g) | 14 | 24 | 4 | 1 |
| Tryptophan (Trp) (mg/100 g) | 4 | 5 | 1 | / |
| Valine (Val) (mg/100 g) | 29 | 34 | 8 | 3 |
| Arginine (Arg) (mg/100 g) | 4 | 9 | 2 | / |
| Histidine (His) (mg/100 g) | 3 | 15 | 3 | / |
| Alanine (Ala) (mg/100 g) | 14 | 112 | 36 | 7 |
| Aspartic acid (Asp) (mg/100 g) | 32 | 71 | 13 | / |
| Glutamic acid (Glu) (mg/100 g) | 41 | 238 | 39 | 9 |
| Glycine (Gly) (mg/100 g) | 19 | 35 | 17 | / |
| Proline (Pro) (mg/100 g) | 5 | 20 | 10 | 5 |
| Serine (Ser) (mg/100 g) | 16 | 31 | 9 | 2 |
| Oligopeptide (mg/100 g) | 0.25 | 0.44 | 0.21 | 0.05 |

TABLE 2

Analysis of Nourishment Composition of Strawberry Juice
Comparison of Different Processings

| | Clear Juice | | | |
|---|---|---|---|---|
| Nourishment Composition | Raw Material (Edible part) | Multienzyme + Ultrasonics | Multienzyme + Pasteuring | Pressing + Pasteuring |
| Water (g/100 g) | 91.7 | 91.2 | 91.3 | 92.3 |
| Protein (g/100 g) | 0.2 | 0.2 | 0.2 | 0.04 |
| Oligopeptide (g/100 g) | 0.05 | 0.2 | 0.15 | / |
| Fat (g/100 g) | 0.4 | 0.46 | 0.46 | 0.40 |
| Dietofiber (g/100 g) | 0.3 | / | / | / |
| Carbohydrate (g/100 g) | 7.2 | 7.6 | 7.6 | 7.2 |
| Oligose (g/100 g) | 6.1 | 6.5 | 6.4 | 5.9 |
| Ash specification (g/100 g) | 0.2 | 0.6 | 0.4 | 0.1 |
| Carrotin (μg/100 g) | / | / | / | / |
| VA (mg/100 g) | / | / | / | / |
| VB1 (mg/100 g) | 0.01 | 0.02 | / | / |
| VB2 (mg/100 g) | / | / | / | / |
| Nicotinic acid (mg/100 g) | 0.16 | 0.20 | / | / |
| VC (mg/100 g) | 10.2 | 10.8 | 2 | / |

TABLE 2-continued

Analysis of Nourishment Composition of Strawberry Juice
Comparison of Different Processings

| | Clear Juice | | | |
|---|---|---|---|---|
| Nourishment Composition | Raw Material (Edible part) | Multienzyme + Ultrasonics | Multienzyme + Pasteuring | Pressing + Pasteuring |
| VE (mg/100 g) | 0.1 | / | / | / |
| K (mg/100 g) | 76 | 85 | 84 | 74 |
| Na (mg/100 g) | 136 | 135 | 127 | 119 |
| Ca (mg/100 g) | 24 | 29 | 0.01 | 0.06 |
| Mg (mg/100 g) | 170 | 123 | 0.01 | 0.05 |
| Fe (mg/100 g) | 0.11 | 0.33 | 10.29 | 11 |
| Mn (mg/100 g) | 0.2 | 0.31 | 0.16 | 0.4 |
| Cu (mg/100 g) | 0.01 | 0.02 | 0.02 | 0.01 |
| Zn (mg/100 g) | 0.07 | 0.06 | 0.05 | 0.04 |
| P (mg/100 g) | 0.07 | 12 | 0.03 | 0.03 |
| Se (μg/100 g) | 0.12 | 0.15 | 0.15 | 0.11 |
| Isoleucine (Ile) (mg/100 g) | 6 | 6 | 1 | / |
| Leucine (Leu) (mg/100 g) | 8 | 9 | 2 | / |
| Lysine (Lys) (mg/100 g) | 7 | 7 | 2 | 2 |
| Methionine (Met) (mg/100 g) | 4 | 4 | / | / |
| Cystine (mg/100 g) | 2 | 2 | / | / |
| Phenylalanine (Phe) (mg/100 g) | 7 | 7 | 6 | 1 |
| Tyrosine (Tyr) (mg/100 g) | 3 | 3 | 2 | / |
| Threonine (Thr) (mg/100 g) | 8 | 8 | 8 | 2 |
| Tryptophan (Trp) (mg/100 g) | 2 | 2 | / | / |
| Valine (Val) (mg/100 g) | 8 | 9 | 7 | 1 |
| Arginine (Arg) (mg/100 g) | 5 | 5 | 1 | / |
| Histidine (His) (mg/100 g) | 2 | 2 | 1 | / |
| Alanine (Aal) (mg/100 g) | 19 | 19 | 12 | 2 |
| Aspartic acid (Asp) (mg/100 g) | 69 | 78 | 64 | 3 |
| Glutamic acid (Glu) (mg/100 g) | 47 | 49 | 42 | 4 |
| Glycine (Gly) (mg/100 g) | 5 | 6 | / | / |
| Proline (Pro) (mg/100 g) | 4 | 4 | / | / |
| Serine (Ser) (mg/100 g) | 9 | 8 | / | / |

TABLE 3

Analysis of Nourishment Composition of Clear Apple Juice
Comparison of Different Processings

| | Clear Juice | | | |
|---|---|---|---|---|
| Nourishment Composition | Raw Material (Edible part) | Multienzyme + Ultrasonics | Multienzyme + Pasteuring | Pressing + Pasteuring |
| Water (g/100 g) | 86.9 | 84.2 | 84.3 | 87.9 |
| Protein (g/100 g) | 0.2 | 0.3 | 0.2 | 0.1 |
| Oligopeptide (mg/100 g) | / | 0.1 | / | / |
| Fat (g/100 g) | 0.1 | 0.3 | 0.3 | 0.1 |
| Dietofiber (g/100 g) | 0.9 | / | / | / |
| Carbohydrate (g/100 g) | 11.8 | 15.0 | 15.0 | 11.8 |
| Oligose (g/100 g) | | | | |
| Ash specification (g/100 g) | 0.1 | 0.2 | 0.2 | 0.1 |
| Carrotin (μg/100 g) | 10 | / | / | / |
| VA (mg/100 g) | 1 | / | / | / |
| VB1 (mg/100 g) | 0.01 | 0.01 | / | / |
| VB2 (mg/100 g) | 0.01 | 0.02 | / | / |
| Nicotinic acid (mg/100 g) | 0.1 | 1.1 | 0.9 | / |
| VC (mg/100 g) | 6 | 7 | 4 | 2 |
| VE (mg/100 g) | / | 0.1 | / | / |
| K (mg/100) | 72 | 194 | 193 | 77 |
| Na (mg/100 g) | 3 | 258 | 231 | 4 |
| Ca (mg/100 g) | 4 | 4 | 0.01 | 0.02 |
| Mg (mg/100 g) | 4 | 3 | 0.01 | 0.01 |
| Fe (mg/100 g) | 0.7 | 0.7 | 0.46 | 0.69 |
| Mn (mg/100 g) | / | 0.1 | 0.12 | / |
| Cu (mg/100 g) | 0.01 | 0.01 | 0.01 | 0.01 |
| Zn (mg/100 g) | 0.27 | 0.54 | 0.22 | 0.30 |
| P (mg/100 g) | 43 | 99 | 0.54 | 0.31 |
| Se (μg/100 g) | 0.1 | 0.21 | 0.19 | 0.09 |
| Isoleucine (Ile) (mg/100 g) | 15 | 21 | 3 | / |
| Leucine (Leu) (mg/100 g) | 6 | 19 | 6 | / |
| Lysine (Lys) (mg/100 g) | 13 | 13 | 12 | 7 |

TABLE 3-continued

Analysis of Nourishment Composition of Clear Apple Juice
Comparison of Different Processings

| Nourishment Composition | Clear Juice | | | |
|---|---|---|---|---|
| | Raw Material (Edible part) | Multienzyme + Ultrasonics | Multienzyme + Pasteuring | Pressing + Pasteuring |
| Methionine (Met) (mg/100 g) | 7 | 7 | 6 | 5 |
| Cystine (mg/100 g) | 9 | 12 | 8 | 4 |
| Phenylalanine (Phe) (mg/100 g) | 11 | 14 | 13 | 10 |
| Tyrosine (Tyr) (mg/100 g) | 9 | 9 | 7 | 2 |
| Threonine (Thr) (mg/100 g) | 4 | 6 | 1 | / |
| Tryptophan (Trp) (mg/100 g) | 14 | 11 | 2 | / |
| Valine (Val) (mg/100 g) | 17 | 24 | 11 | 2 |
| Arginine (Arg) (mg/100 g) | / | 3 | 1 | / |
| Histidine (His) (mg/100 g) | 1 | 3 | / | / |
| Alanine (Ala) (mg/100 g) | 19 | 17 | 14 | 11 |
| Aspartic acid (Asp) (mg/100 g) | 27 | 58 | 26 | 12 |
| Glutamic acid (Glu) (mg/100 g) | 17 | 19 | 18 | 17 |
| Glycine (Gly) (mg/100 g) | 11 | 16 | 4 | 2 |
| Proline (Pro) (mg/100 g) | 7 | 4 | 3 | / |
| Serine (Ser) (mg/100 g) | 12 | 14 | 12 | 6 |

TABLE 4

Analysis of Nourishment Composition of Hawthorn Juice
Comparison of Different Processings

| Nourishment Composition | Raw Material (Edible part) | Multienzyme + Ultrasonics | Multienzyme + Pasteuring | Pressing + Pasteuring |
|---|---|---|---|---|
| | Raw Juice of Fresh Hawthrons | | | |
| Water (g/100 g) | 73.2 | 69 | 70.1 | 78.3 |
| Protein (g/100 g) | 0.7 | 1.26 | 0.89 | 0.1 |
| Oligopeptide (mg/100 g) | 0.3 | 0.63 | 0.45 | / |
| Fat (g/100 g) | 0.3 | 3.9 | 3.9 | 0.3 |
| Dietofiber (g/100 g) | 2.7 | / | / | / |
| Carbohydrate (g/100 g) | 22.3 | 23.9 | 23.9 | 21.1 |
| Oligose (g/100 g) | 11.1 | 19.6 | 19.4 | 16.2 |
| Ash specification (g/100 g) | 08 | 1.94 | 1.21 | 0.2 |
| Carrotin (μg/100 g) | 471 | / | / | / |
| VA (mg/100 g) | 53 | / | / | / |
| VB1 (mg/100 g) | / | / | / | / |
| VB1 (mg/100 g) | / | / | / | / |
| Nicotinic acid (mg/100 g) | 0.4 | / | / | / |
| VC (mg/100 g) | / | / | / | / |
| VE (mg/100 g) | / | / | / | / |
| K (mg/100 g) | 274 | 430 | 376 | 266 |
| Na (mg/100 g) | 11 | 290 | 184 | 11 |
| Ca (mg/100 g) | 55 | 44 | 19 | / |
| Mg (mg/100 g) | 21 | 31 | 2 | / |
| Fe (mg/100 g) | 0.7 | 0.7 | 0.4 | 0.6 |
| Mn (mg/100 g) | 0.52 | 0.55 | 0.55 | 0.50 |
| Cu (mg/100 g) | 0.16 | 0.12 | 0.08 | 0.01 |
| Zn (mg/100 g) | 0.16 | 0.22 | 0.22 | 0.01 |
| P (mg/100 g) | 42 | 46 | 45 | 0.44 |
| Se (mg/100 g) | 2.4 | 2.33 | 2.24 | 2.39 |
| Isoleucine (Ile) (mg/100 g) | 10 | 18 | 12 | 2 |
| Leucine (Leu) (mg/100 g) | 41 | 59 | 44 | 4 |
| Lysine (Lys) (mg/100 g) | 25 | 41 | 32 | 3 |
| Methonine (Met) (mg/100 g) | 2 | 5 | 5 | 1 |
| Cystine (Cys) (mg/100 g) | 5 | 7 | 6 | / |
| Phenylalanine (Phe) (mg/100 g) | 15 | 24 | 21 | / |
| Tyrosine (Tyr) (mg/100 g) | / | / | / | / |
| Threonine (Thr) (mg/100 g) | 14 | 21 | 11 | 1 |
| Tryptophan (Try) (mg/100 g) | / | 1 | / | / |
| Valine (Val) (mg/100 g) | 41 | 44 | 23 | 16 |
| Arginine (Arg) (mg/100 g) | 5 | 9 | / | / |
| Histidine (His) (mg/100 g) | 44 | 98 | 71 | 24 |
| Alanine (Ala) (mg/100 g) | 11 | 28 | 19 | 6 |
| Aspartic acid (Asp) (mg/100 g) | 49 | / | 52 | 9 |
| Glutamic acid (Glu) (mg/100 g) | 24 | 71 | 54 | 7 |
| Glycine (Gly) (mg/100 g) | 25 | 24 | 17 | 1 |

TABLE 4-continued

Analysis of Nourishment Composition of Hawthorn Juice
Comparison of Different Processings

| Nourishment Composition | Raw Material (Edible part) | Multienzyme + Ultrasonics | Multienzyme + Pasteuring | Pressing + Pasteuring |
|---|---|---|---|---|
| Proline (Pro) (mg/100 g) | 62 | 71 | 41 | 4 |
| Serine (Ser) (mg/100 g) | 22 | 37 | 26 | 6 |
| | Juice of Dried Hawthrons (15%) | | | |
| Water (g/100 g) | 12.4 | 86.8 | 87.4 | 95.5 |
| Protein (g/100 g) | 2.4 | 0.5 | 0.1 | 0.05 |
| Oligopeptide (mg/100 g) | / | 0.3 | 0.1 | / |
| Fat (g/100 g) | 0.3 | 0.5 | 0.5 | 0.04 |
| Dietofiber (g/100 g) | 54.4 | / | / | / |
| Carbohydrate (g/100 g) | 26.3 | 11.4 | 11.4 | 4.0 |
| Oligose (mg/100 g) | / | 9.2 | 9.2 | 1.4 |
| Ash specification (g/100 g) | 4.2 | 0.8 | 0.6 | 0.4 |
| Carrotin (pg/100 g) | 160 | 7 | 0.1 | / |
| VA (mg/100 g) | 2 | 2 | 0.06 | / |
| VB1 (mg/100 g) | / | 0.01 | / | / |
| VB2 (mg/100 g) | / | 0.01/ | / | / |
| Nicotinic acid (mg/100 g) | / | 0.10/ | / | / |
| VC (mg/100 g) | / | 2 | 2 | / |
| VE (mg/100 g) | / | / | / | / |
| K (mg/100 g) | 446 | 107 | 84 | 71 |
| Na (mg/100 g) | 21 | 3 | 7 | 3 |
| Ca (mg/100 g) | 151 | 44 | 0.4 | 0.1 |
| Mg (mg/100 g) | / | 4 | 0.1 | / |
| Fe (mg/100 g) | 0.9 | 0.2 | 0.2 | 0.2 |
| Mn (mg/100 g) | 0.6 | 0.1 | 0.1 | 0.1 |
| Cu (mg/100 g) | 0.6 | 0.2 | 0.1 | 0.01 |
| Zn (mg/100 g) | 0.7 | 0.3 | 0.2 | 0.09 |
| P (mg/100 g) | 91 | 24 | 24 | 11 |
| Se (μg/100 g) | 3.18 | 0.68 | 0.59 | 0.44 |
| Isoleucine (Ile) (mg/100 g) | 19 | 31 | 2 | 1 |
| Leucine (Leu) (mg/100 g) | 21 | 44 | 5 | 3 |
| Lysine (Lys) (mg/100 g) | 31 | 42 | 2 | 2 |
| Mehionine (Met) (mg/100 g) | 2 | 7 | / | / |
| Cystine (mg/100 g) | / | 1 | / | / |
| Phenylalanine (Phe) (mg/100 g) | 12 | 25 | 7 | 3 |
| Tyrosine (Tyr) (mg/100 g) | 12 | 12 | 3 | 1 |
| Threonine (Thr) (mg/100 g) | 17 | 25 | 4 | 2 |
| Tryptophan (Trp) (mg/100 g) | 2 | 3 | 1 | / |
| Valine (Val) (mg/100 g) | 2 | 4 | 4 | 2 |
| Arginine (Arg) (mg/100 g) | 1 | 5 | / | / |
| Histidine (His) (mg/100 g) | 9 | 11 | 16 | 1 |
| Alanine (Ala) (mg/100 g) | 13 | 25 | 19 | 5 |
| Aspartic acid (Asp) (mg/100 g) | 24 | 95 | 29 | 7 |
| Glutamic acid (Glu) (mg/100 g) | 77 | 90 | 3 | 1 |
| Glycine (Gly) (mg/100 g) | 21 | 26 | / | / |
| Proline (Pro) (mg/100 g) | 9 | 21 | 2 | 1 |
| Serine (Ser) (mg/100 g) | / | / | / | / |

TABLE 5

Analysis of Nourishment Composition of Carrot Juice
Comparison of Different Processings

| | Raw Juice of Carrots | | | |
|---|---|---|---|---|
| Nourishment Composition | Raw Material (Edible part) | Multienzyme + Ultrasonics | Multienzyme + Pasteuring | Pressing + Pasteuring |
| Water (g/100 g) | 88.1 | 88.1 | 88.2 | 90.7 |
| Protein (g/100 g) | 0.7 | 0.9 | 0.8 | 0.1 |
| Fat (g/100 g) | 0.2 | 0.4 | 0.4 | 0.4 |
| Dietofiber (g/100 g) | 1.9 | / | / | / |
| Carbohydrate (g/100 g) | 8.5 | 10.2 | 10.4 | 8.5 |
| Ash Specification (g/100 g) | 0.4 | 6.4 | 0.3 | 0.3 |
| Carrotin (μg/100 g) | 4144 | 2524 | 2494 | 2455 |
| VA (mg/100 g) | 631 | 2291 | 2311 | 2367 |
| VB1 (mg/100) | 0.01 | 0.01 | / | / |
| VB2 (mg/100 g) | 0.07 | 0.06 | / | / |
| Nicotinic acid (mg/100 g) | 1.0 | 0.92 | 0.88 | 0.61 |
| VC (mg/100 g) | 7 | 7 | 1 | / |

TABLE 5-continued

Analysis of Nourishment Composition of Carrot Juice
Comparison of Different Processings

| | Raw Juice of Carrots | | | |
|---|---|---|---|---|
| Nourishment Composition | Raw Material (Edible part) | Multienzyme + Ultrasonics | Multienzyme + Pasteuring | Pressing + Pasteuring |
| VE (mg/100 g) | 0.25 | 0.14 | 0.11 | / |
| K (mg/100 g) | 1100 | 1221 | 1117 | 1246 |
| Na (mg/100 g) | 624 | 714 | 704 | 771 |
| Ca (mg/100 g) | 465 | 559 | 0.01 | 0.01 |
| Mg (mg/100 g) | 82 | 81 | 0.01 | 0.01 |
| Fe (mg/100 g) | 9.1 | 7.4 | 2.6 | 2.1 |
| Mn (mg/100 g) | 0.74 | 0.79 | 0.55 | 0.53 |
| Cu (mg/100 g) | 0.19 | 0.21 | 0.09 | 0.09 |
| Zn (mg/100 g) | 0.91 | 0.88 | 0.77 | 0.64 |
| P (mg/100 g) | 121 | 119 | 0.64 | 0.50 |
| Se (mg/100 g) | 2.1 | 2.20 | 2.06 | 2.17 |
| Isoleucine (Ile) (mg/100 g) | 21 | 33 | 21 | 2 |
| Leucine (Leu) (mg/100 g) | 44 | 48 | 36 | 4 |
| Lysine (Lys) (mg/100 g) | 44 | 41 | 44 | 7 |
| Methonine (Met) (mg/100 g) | 19 | 19 | 11 | 2 |
| Cystine (mg/100 g) | 17 | 19 | 9 | 1 |
| Phenylalanine (Phe) (mg/100 g) | 34 | 27 | 22 | 3 |
| Tyrosine (Tyr) (mg/100 g) | 27 | 19 | 11 | 3 |
| Threonine (Thr) (mg/100 g) | 34 | 37 | 9 | 2 |
| Tryptophan (Try) (mg/100 g) | 27 | 8 | 1 | / |
| Valine (Val) (mg/100 g) | 71 | 49 | 22 | 4 |
| Arginine (Arg) (mg/100 g) | 42 | 35 | 19 | 4 |
| Histidine (His) (mg/100 g) | 15 | 10 | 2 | / |
| Alanine (Sla) (mg/100 g) | 41 | 47 | 44 | 9 |
| Aspartic acid (Asp) (mg/100 g) | 127 | 121 | 97 | 6 |
| Glutamic acid (Glu) (mg/100 g) | 189 | 211 | 104 | 13 |
| Glycine (Gly) (mg/100 g) | 32 | 31 | 2 | / |
| Proline (Pro) (mg/100 g) | 20 | 25 | 6 | / |
| Serine (Ser) (mg/100 g) | 47 | 29 | 17 | 2 |

TABLE 6

Analysis of Nourishment Composition of Shelled Peanuts Latices
Comparison of Raw Material and the Juice

| | Peanut Latices | |
|---|---|---|
| Nourishment Composition | Raw Material (without afterbirth) | Multienzyme + Ultrasonics |
| Water (g/100 g) | 7.6 | 90.7 |
| Protein (g/100 g) | 34.2 | 3.44 |
| Oligopeptide (g/100 g) | 2.4 | 1.6 |
| Fat (g/100 g) | 44.4 | 4.50 |
| Dietofiber (g/100 g) | 5.9 | / |
| Carbohydrate (g/100 g) | 5.9 | 0.81 |
| Ash specification (g/100 g) | 2.0 | 0.22 |
| Carrotin (μg/100 g) | / | / |
| VA (mg/100 g) | / | / |
| VB1 (mg/100 g) | 0.60 | 0.06 |
| VB1 (mg/100 g) | 0.10 | 0.01 |
| Nicotinic acid (mg/100 g) | 14.7 | 1.51 |
| VC (mg/100 g) | 16 | 1.2 |
| VE (mg/100 g) | 12.93 | / |
| K (mg/100 g) | 511 | 52.6 |
| Na (mg/100 g) | 14 | 31 |
| Ca (mg/100 g) | 288 | 25.4 |
| Mg (mg/100 g) | 249 | 25.1 |
| Fe (mg/100 g) | 1.2 | 0.1 |
| Mn (mg/100 g) | 1.9 | 0.2 |
| Cu (mg/100 g) | 2.8 | 0.3 |
| Zn (mg/100 g) | 0.06 | / |
| P (mg/100 g) | 317 | 32.0 |
| Se (μg/100 g) | 7.24 | 0.73 |
| Isoleucine (Ile) (mg/100 g) | 1130 | 112 |
| Leucine (Leu) (mg/100 g) | 2428 | 244 |
| Lysine (Lys) (mg/100 g) | 2300 | 228 |
| Methionine (Met) (mg/100 g) | 314 | 31 |
| Cystine (mg/100 g) | 275 | 28 |
| Phenylalanine (Met) (mg/100 g) | 1820 | 177 |
| Tyrosine (Tyr) (mg/100 g) | 221 | 24 |
| Threonine (Thr) (mg/100 g) | 1100 | 101 |
| Tryptophan (Trp) (mg/100 g) | 440 | 50 |
| Valine (Val) (mg/100 g) | 1625 | 163 |
| Arginine (Arg) (mg/100 g) | 3790 | 382 |
| Histidine (His) (mg/100 g) | 1144 | 114 |
| Alanine (Ala) (mg/100 g) | 1900 | 187 |
| Aspartic acid (Asp) (mg/100 g) | 3220 | 326 |
| Glutamic acid (Glu) (mg/100 g) | 5546 | 560 |
| Glycine (Gly) (mg/100 g) | 2510 | 251 |
| Proline (Pro) (mg/100 g) | 1911 | 192 |
| Serine (Ser) (mg/100 g) | 1954 | 194 |

What is claimed is:

1. A process for preparing a juice or a protein emulsion from a dried vegetable, a dried fruit or a mixture thereof, the process comprising:
forming a mash from a raw material of the dried vegetable, the dried fruit or the mixture thereof,
grinding the mash finely, so that the average size of suspended particles therein is less than 50 microns,
hydrolyzing the ground mash at a temperature of 20° C. to about 70° C. for about 5 minutes to about 72 hours, with a multi-enzyme system that contains in combination 5–50 wt % proteases, 5–75 wt % amylases, 5–50 wt % pectases, 5–75 wt % cellulases, 5–35 wt % hemicellulases and 1–20 wt % lysozymes, filtering the hydrolyzed ground mash to remove residues, and sterilizing the filtrate.

2. A process as recited in claim 1, wherein said dried vegetable or dried fruit is selected from the group consisting of:

watermelon, whitemelon, brandmelon, snakemelon, Chinese wax gourd, Buddhism's handmelon, rlamiflame melon, pumpkin, cucumber, bittergourd, papaya, balsam pear, Chinese flowering quince, vegetable sponge, muskmelon, pineapple, polarimaya, strawberry, guava, flowering crabapple, yellowpine, pear, plum, lichen, berry, loquat, apple, grape, green plum, ginsenberry, mulberry, marrow-leaved oleaster, Chinese date, persimmon, peach, fig, apricot, red bayberry, cherry, kiwi, banana, sugarcane, hawthorn, wild roses, rhodiola sacra, cactus, orange, Mandarin orange, tangerine, mung bean sprout, soybean sprouts, water chestnut, lily, potatoes, carrot, ginger, radishes, lotus root, Chinese yam, bamboo shoots, Chinese cabbage, spinach, cauliflower, water shield, Chinese onion, garlic, amaranth, fellen, shepherd's purse, wild rice stem, lent mustard, Chinese chive, sonchus oleraceus, fern, aspirates, Lucerne, celery, shepherd's purse, leek, lettuce, water spinach, tender leaves of Chinese toon, coriander, hyacinth bean, broadbean, blackbean, black soybean, love pea, string bean, mung bean, pea, red bean, peanut, walnut, apricot stone, Chinese olive, ginkgo, sunflower seed, lotus seed, pumpkin seed, coconut, hazelnut, algar, kelp, mushroom, black rice, barley, wheat, corn shepherd seed, barley plumule, wheat plamule, grain plumule and corn plumale.

3. A process as recited in claim 1, wherein said dried vegetable or dried fruit is selected from the group consisting of:

hawthorn, carrot, apple, watermelon, Hami melon, strawberry, grape, banana, orange, lotus root, peanut, sunflower seed, chestnut, kelp, mushroom, green plumales of wheat and flowering crabapple.

4. A process as recited in claim 1, wherein the specific concentration of the enzyme system is from about 0.1 to about 100 IU/g substrate.

5. A process as claimed in claim 1, wherein the multi-enzyme system further comprises a supplementary enzyme.

6. A process as claimed in claim 1, wherein the method for sterilizing is ultrasonication.

7. A process as claimed in claim 6, wherein the ultrasonication is under the conditions of about 20–100 KHz of frequency, over 100 W/cm$^2$ of power density and about 1~25 m/s of a flow speed of the material to be sterilized.

* * * * *